United States Patent
Mednik et al.

(10) Patent No.: US 9,602,015 B2
(45) Date of Patent: Mar. 21, 2017

(54) COMMUNICATION METHOD AND APPARATUS USING MODULATION OF POST-CONDUCTION OSCILLATION FREQUENCY IN SWITCHING CONVERTERS

(71) Applicant: Microchip Technology Incorporated, Chandler, AZ (US)

(72) Inventors: Alexander Mednik, Campbell, CA (US); Simon Krugly, San Jose, CA (US)

(73) Assignee: Microchip Technology Inc., Chandler, AZ (US)

(*) Notice: Subject to any disclaimer, the term of this patent is extended or adjusted under 35 U.S.C. 154(b) by 0 days.

(21) Appl. No.: 14/872,878

(22) Filed: Oct. 1, 2015

(65) Prior Publication Data

US 2016/0182131 A1 Jun. 23, 2016

Related U.S. Application Data

(63) Continuation of application No. 62/096,302, filed on Dec. 23, 2014.

(51) Int. Cl.
*H02M 1/00* (2006.01)
*H02M 3/335* (2006.01)
*H04B 5/00* (2006.01)
*H02M 3/24* (2006.01)

(52) U.S. Cl.
CPC ......... *H02M 3/33523* (2013.01); *H02M 3/24* (2013.01); *H04B 5/00* (2013.01); *H02M 3/33576* (2013.01)

(58) Field of Classification Search
USPC ....... 455/41.1; 363/131, 21.04, 21.16, 21.17, 363/89
See application file for complete search history.

(56) References Cited

U.S. PATENT DOCUMENTS

| | | | | |
|---|---|---|---|---|
| 6,018,469 A | * | 1/2000 | Poon | H02M 1/34 363/131 |
| 7,606,051 B1 | * | 10/2009 | Wittenbreder, Jr. | H02M 3/33576 363/21.04 |
| 2009/0147547 A1 | * | 6/2009 | Yamashita | H02M 3/33507 363/21.16 |

(Continued)

*Primary Examiner* — Ganiyu A Hanidu
(74) *Attorney, Agent, or Firm* — Burr & Forman LLP; Ryan M. Corbett

(57) ABSTRACT

A communication method and apparatus that uses modulation of post-conduction oscillation frequency in switching converters is provided. The apparatus may include a converter having a magnetic element having a primary winding and a secondary winding, a first switch, a control circuit configured to repeatedly activate the first switch to couple an input voltage source to the primary winding to store electrical energy in the magnetic element, and a diode coupled to the secondary winding, said diode configured to couple the secondary winding to a load to deliver the electrical energy stored in the magnetic element, and a communication apparatus having a second switch, a first modulator capacitor coupled to the secondary winding, a first transmitter configured to activate the second switch in accordance with a first input signal, and a first receiver configured to detect a post-conduction oscillation frequency of a voltage signal at the primary or secondary windings.

21 Claims, 5 Drawing Sheets

(56) References Cited

U.S. PATENT DOCUMENTS

| | | | |
|---|---|---|---|
| 2013/0121049 A1* | 5/2013 | Shi | H02M 1/44 363/89 |
| 2013/0329470 A1* | 12/2013 | Stroppa | H02M 3/3376 363/21.17 |
| 2014/0347021 A1* | 11/2014 | Mednik | H02M 3/156 323/235 |
| 2015/0244246 A1* | 8/2015 | Krueger | H02M 1/00 363/21.17 |

* cited by examiner

COMMUNICATION METHOD AND APPARATUS USING MODULATION OF POST-CONDUCTION OSCILLATION FREQUENCY IN SWITCHING CONVERTERS

CROSS REFERENCE TO RELATED APPLICATION

This application claims the benefit of U.S. Provisional Patent Application No. 62/096,302, filed on Dec. 23, 2014, which is incorporated herein by reference in its entirety.

TECHNICAL FIELD

The exemplary embodiments disclosed herein generally relate to a communications apparatus that communicates using the detected changes in the oscillation frequency in the windings of a flyback converter.

SUMMARY

According to an aspect of one or more exemplary embodiments, there is provided an apparatus including a converter and a communication apparatus. The converter may include a magnetic element having a primary winding and a secondary winding, a first switch, a control circuit configured to repeatedly activate the first switch to couple an input voltage source to the primary winding to store electrical energy in the magnetic element, and a diode coupled to the secondary winding. The diode may be configured to couple the secondary winding to a load to deliver the electrical energy stored in the magnetic element.

The communication apparatus may include a second switch, a first modulator capacitor coupled to the secondary winding, a first transmitter configured to activate the second switch in accordance with a first input signal, and a first receiver configured to detect an oscillation frequency of a voltage signal at the primary or secondary windings caused by delivering the electrical energy stored in the magnetic element.

The second switch may be configured to couple the first modulator capacitor to the secondary winding and a cathode of the diode.

The first receiver may be configured to detect a change in the oscillation frequency caused by coupling the first modulator capacitor to the secondary winding.

The first receiver may be coupled to the primary winding to detect the oscillation frequency at the primary winding.

The magnetic element may also include an auxiliary winding, and the first receiver may be coupled to the auxiliary winding to detect the oscillation frequency of a voltage signal at the auxiliary winding.

The second switch may be configured to couple the first modulator capacitor to the secondary winding and an anode of the diode.

The converter may also include a synchronous rectifier switch connected in place of the diode.

The first receiver may include a sample-and-hold circuit that stores a voltage level of the auxiliary winding, a first divider circuit that generates a first reference voltage level based on a first divider ratio and the voltage level stored by the sample-and-hold circuit, a second divider circuit that generates a second reference voltage level based on a second divider ratio and the voltage level stored by the sample-and-hold circuit, and a window comparator that generates a pulse signal having a width corresponding to a period of time during which the voltage level of the auxiliary winding is between the first reference voltage level and the second reference voltage level. The second reference voltage level may be chosen to be substantially zero.

The first receiver may also include an output logic circuit that generates a first output signal based on the width of the pulse signal.

The first output signal generated by the output logic circuit may be received as an input by the control circuit to control activation of the first switch.

The input signal received by the first transmitter may be an output voltage at the load.

The apparatus may also include a third switch, a second transmitter configured to activate the third switch in accordance with a second input signal, a second modulator capacitor coupled to the second transmitter, and a second receiver configured to detect an oscillation frequency of a voltage signal at at least one of the primary, secondary and auxiliary windings.

The third switch may be configured to couple the second modulator capacitor to the auxiliary winding.

The second receiver may be configured to detect a change in the oscillation frequency caused by coupling the second modulator capacitor to the auxiliary winding.

The third switch may be configured to couple the second modulator capacitor to the primary winding.

The second receiver may be coupled to the secondary winding to detect the oscillation frequency of a voltage signal at the secondary winding.

The second receiver may generate a second output signal based on the oscillation frequency detected by the second receiver.

According to an aspect of another exemplary embodiment, there is provided a communication method that includes generating post-conduction oscillation of a voltage signal at one or more windings of a magnetic element, activating a switch to couple a modulator capacitor to at least one of the windings of the magnetic element, detecting a change in a frequency of the post-conduction oscillation of the voltage signal at one or more windings of the magnetic element caused by coupling the modulator capacitor to the at least one of the windings of the magnetic element, and generating an output signal based on a result of detecting the change in the frequency of the post-conduction oscillation of the voltage signal at one or more windings of the magnetic element.

DETAILED DESCRIPTION OF EXEMPLARY EMBODIMENTS

Figure 1:
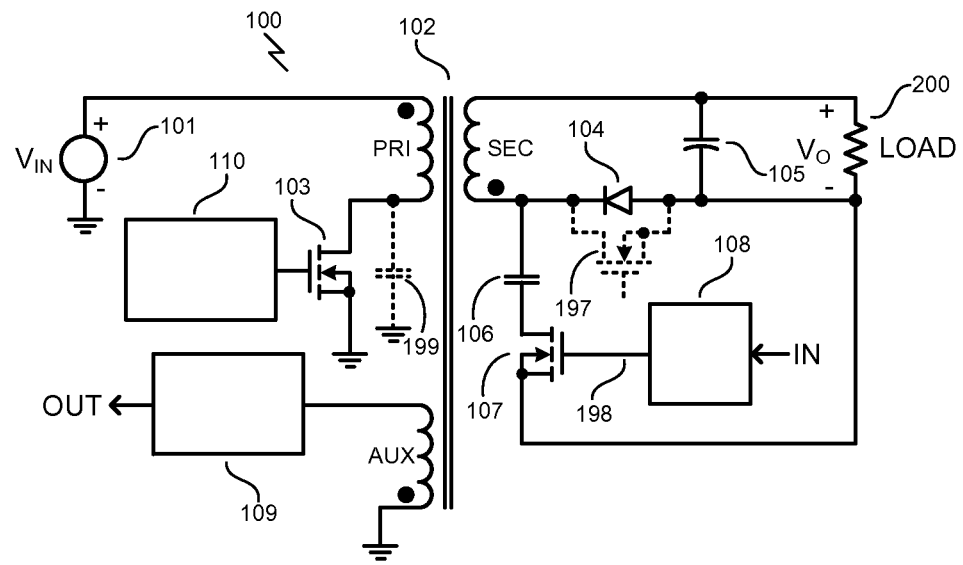
FIG. 1 is a circuit diagram of a communications apparatus according to an exemplary embodiment.

Reference will now be made in detail to the following exemplary embodiments, which are illustrated in the accompanying drawings, wherein like reference numerals refer to like elements throughout. The exemplary embodiments may be embodied in various forms without being limited to the exemplary embodiments set forth herein. Descriptions of well-known parts are omitted for clarity.

FIG. 1 shows a communications apparatus according to an exemplary embodiment that is applied to a discontinuous conduction-mode (DCM) flyback converter 100. Referring to FIG. 1, the converter 100 receives an input voltage VIN from an input source 101 and delivers an output voltage VO to a load 200.

The flyback converter 100 may include a magnetic element 102 having a primary winding PRI, a secondary winding SEC, and a sense winding AUX; a controlled switch 103; a control circuit 110; a rectifier diode 104 having an anode and a cathode; and an output smoothing capacitor 105. The flyback converter 100 may also include a synchronous rectifier switch 197 connected in place of the rectifier diode 104. In operation, the control circuit 110 activates the switch 103 repetitively to couple the primary winding PRI to the input source 101 for receiving electrical energy from the source 101 and storing it in the magnetic element 102.

When the switch 103 is deactivated by the control circuit 110, the rectifier diode 104 conducts, coupling the secondary winding SEC to the load 200 and delivering the energy stored in the magnetic element 102 to the load 200. When the stored energy is depleted fully, the diode 104 becomes reverse-biased giving rise to post-conduction oscillation at all windings: PRI, SEC, and AUX. The oscillation frequency is determined by the inductance of the magnetic element 102 and a parasitic capacitance 199. The total capacitance 199 is contributed to by output capacitance of the switch 103, reverse-biased junction capacitance of the diode 104 reflected to PRI, inter-winding capacitance of the magnetic element 102, and other parasitic capacitances.

The communication apparatus according to the exemplary embodiment may include a second controlled switch 107; a transmitter 108; a modulator capacitor 106; and a receiver 109. The transmitter 108 generates a drive signal 198 activating the second controlled switch 107 in accordance with an external input signal IN. The second controlled switch 107 couples the modulator capacitor 106 to the secondary winding SEC and to the cathode of the diode 104. The capacitor 106 contributes to the total parasitic capacitance 199 and alters the post-conduction oscillation frequency at the windings PRI, SEC, and AUX. The receiver 109 detects the change in the oscillation frequency at the sense winding AUX and generates an output signal OUT as a function of the input signal IN.

Figure 2:
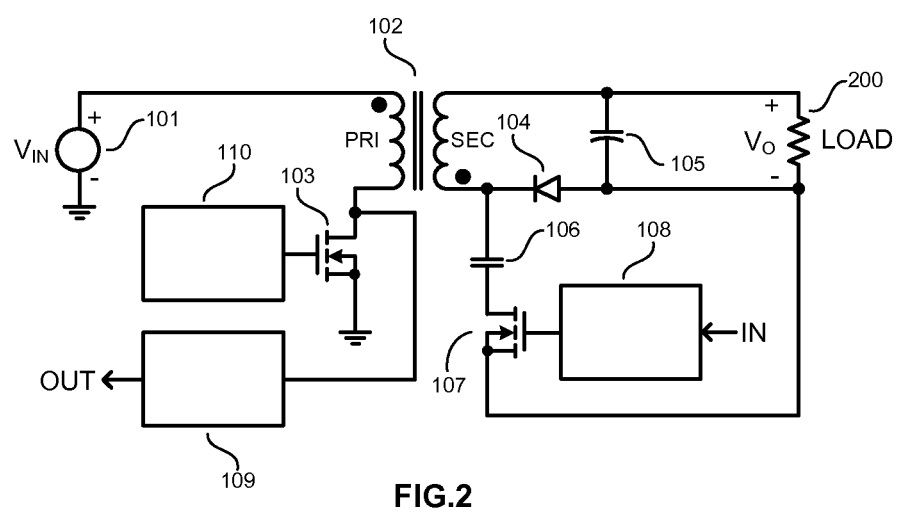
FIG. 2 is a circuit diagram of a communications apparatus according to another exemplary embodiment.

FIG. 2 depicts a communication apparatus according to another exemplary embodiment. The communication apparatus of FIG. 2 is similar to the communication apparatus shown in the exemplary embodiment of FIG. 1, but instead of the receiver 109 being connected to the sense winding AUX, the receiver 109 is connected to the primary winding PRI. Thus, the receiver 109 in the exemplary embodiment of FIG. 2 detects the change in the oscillation frequency at the winding PRI and generates an output signal OUT as a function of the input signal IN.

Figure 3:
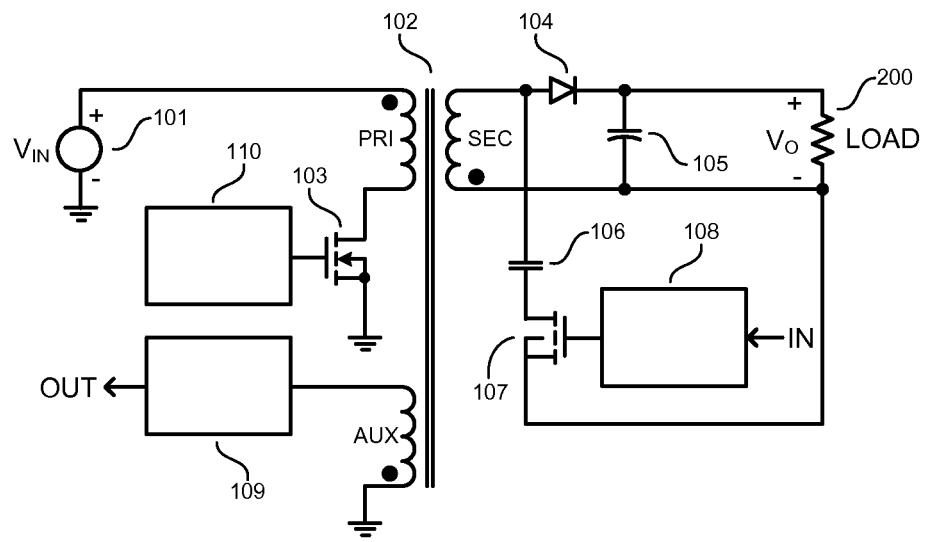
FIG. 3 is a circuit diagram of a communications apparatus according to yet another exemplary embodiment.

FIG. 3 depicts a communication apparatus according to another exemplary embodiment. The communication apparatus of FIG. 3 is similar to the communication apparatus shown in the exemplary embodiment of FIG. 1, except that the capacitor 106 is coupled to the anode of the diode 104, rather than the cathode of diode 104.

Figure 4:
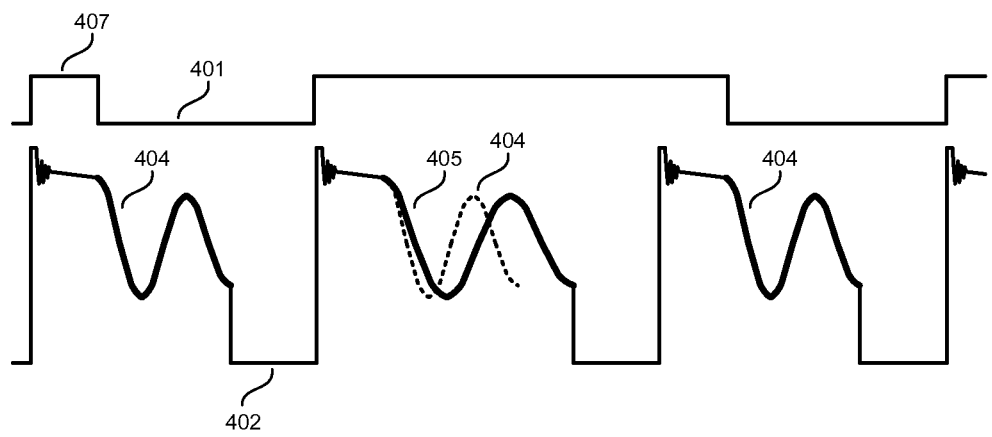
FIG. 4 is a waveform diagram showing operation of the communications apparatus according to the exemplary embodiment of FIG. 1.

FIG. 4 illustrates the operation of the communication apparatus according to the exemplary embodiment of FIG. 1. Referring to FIG. 4, waveform 401 represents the drive signal 198, and waveform 402 represents the voltage at the windings PRI, SEC, and AUX of the magnetic element 102. A ring period 404 represents the post-conduction oscillation when the second control switch 107 is not activated by the transmitter 108. A ring period 405 represents the altered post-conduction oscillation when the second control switch 107 is activated by the transmitter 108. The altered ring period 405 is detected by the receiver 109. The second control switch 107 may also couple the modulator capacitor 106 to the secondary winding SEC during the conduction period 407 of the diode 104 to reset the voltage at the capacitor 106.

Figure 5:
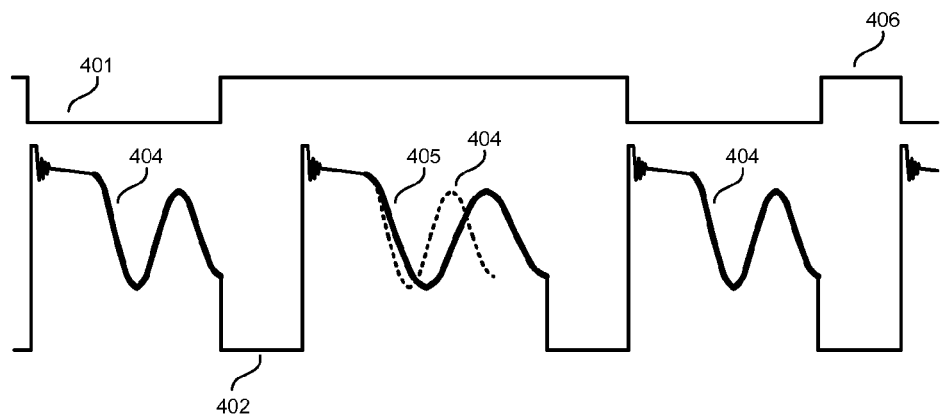
FIG. 5 is a waveform diagram showing operation of the communication apparatus according to the exemplary embodiment of FIG. 1.

FIG. 5 shows the waveforms of FIG. 4, wherein the second control switch 107 may couple the modulator capacitor 106 to the secondary winding SEC during the conduction period 406 of the controlled switch 103 to reset the voltage at the capacitor 106.

Figure 6:
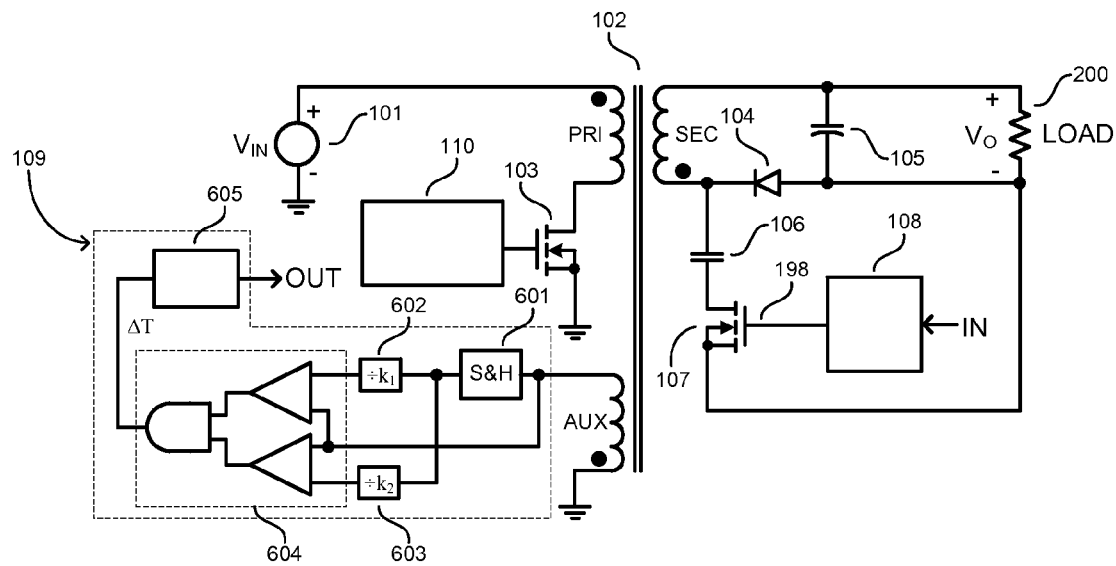
FIG. 6 is a circuit diagram showing an exemplary embodiment of the receiver according to the exemplary embodiment of FIG. 1.

FIG. 6 depicts the communication apparatus according to the exemplary embodiment of FIG. 1, wherein the receiver 109 may include a sample-and-hold circuit 601; a first divider element 602 having a divider ratio k1; a second divider element 603 having a divider ratio k2; a window comparator 604; and an output logic block 605. The sample-and-hold circuit 601 stores a voltage level which appears at the sense winding AUX during the conduction period 407 of the diode 104. The dividers 602 and 603 form two reference levels in proportion with the stored voltage level of the sample-and-hold circuit 601. The window comparator 604 generates a pulse of a width ΔT, which corresponds to the period of time in which the voltage level at the winding AUX is between or equal to the two reference levels formed by the dividers 602 and 603. The output logic block 605 generates the output signal OUT in accordance with the pulse width ΔT. One of the two divider ratios k1 and k2 may be selected to be substantially zero.

Figure 7:
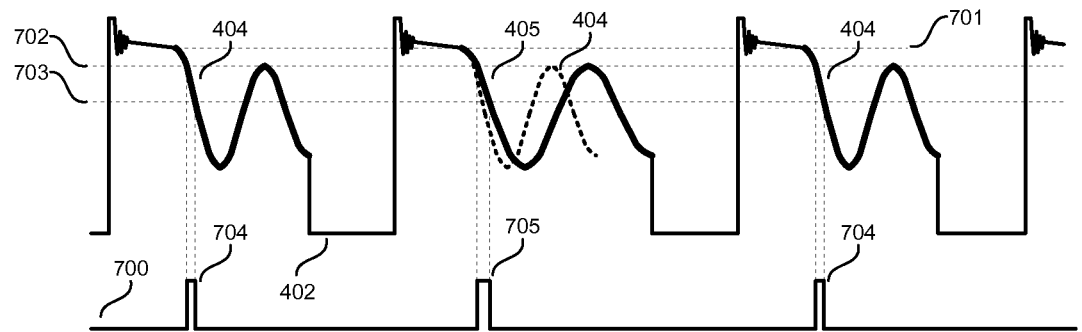
FIG. 7 is a waveform diagram showing operation of the communication apparatus according to the exemplary embodiment of FIG. 6.

FIG. 7 illustrates the operation of the communication apparatus according to the exemplary embodiment of FIG. 6, as explicated by FIG. 4 and FIG. 5. Referring to FIG. 7, waveform 700 represents the pulse width ΔT. A voltage level 701 represents the output of the sample and hold circuit 601. Threshold levels 702 and 703 represent the reference levels formed by the dividers 602 and 603. The pulse width ΔT is generated for the period of time in which the voltage 402 at the sense winding AUX falls between the thresholds 702 and 703, thereby making a pulse width 704 substantially in proportion with the oscillation frequency of the ring period 404, and making a pulse width 705 substantially in proportion with the oscillation frequency of the ring period 405. As the oscillation frequency changes, the pulse width ΔT changes in a corresponding manner. The modulation of the oscillation frequency can be used as a communication method. For example, a transition from the oscillation frequency of ring period 404 to the oscillation frequency of ring period 405 may signify a transition from a digital value of zero to a digital value of one. Conversely, a transition from the oscillation frequency of ring period 405 to the oscillation frequency of ring period 404 may signify a transition from a digital value of one to a digital value of zero.

Figure 8:
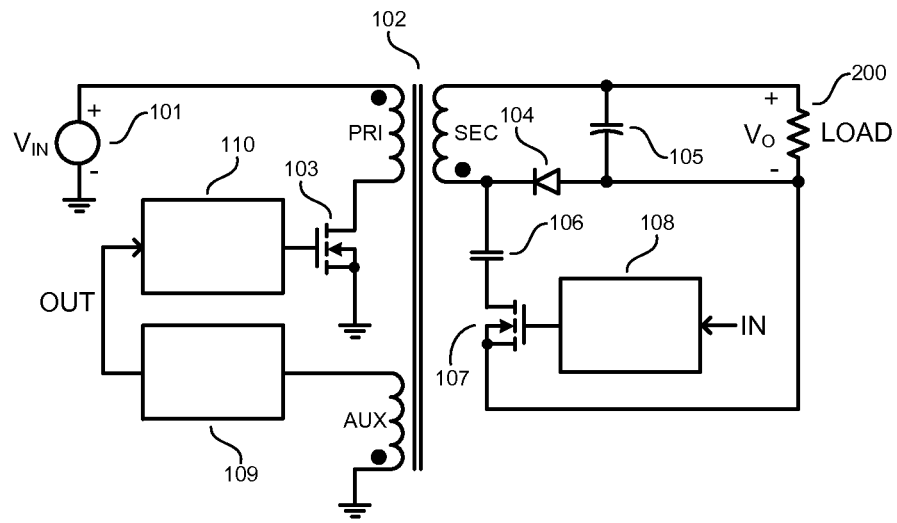
FIG. 8 is a circuit diagram of a communications apparatus according to yet another exemplary embodiment.

FIG. 8 depicts a communication apparatus according to another exemplary embodiment. Referring to FIG. 8, the communication apparatus according to the exemplary embodiment is similar the exemplary embodiment of FIG. 1, except that in the present exemplar embodiment, the output signal OUT of the receiver 109 is coupled to the control circuit 110 for controlling the switch 103 in response to the input signal IN received by the transmitter 108.

Figure 9:
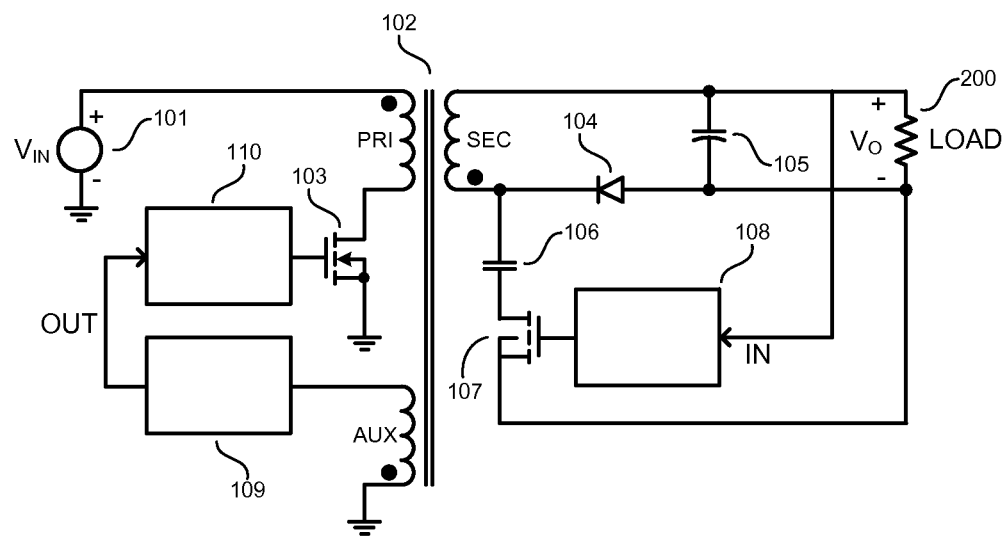
FIG. 9 is a circuit diagram of a communications apparatus according to yet another exemplary embodiment.

FIG. 9 depicts a communication apparatus according to another exemplary embodiment. Referring to FIG. 9, the communication apparatus according the exemplary embodiment is similar to the exemplary embodiment of FIG. 8, except that the input signal IN received by the receiver 108 is the output voltage VO. In this way, output voltage feedback can be implemented without use of an optocoupler.

Figure 10:
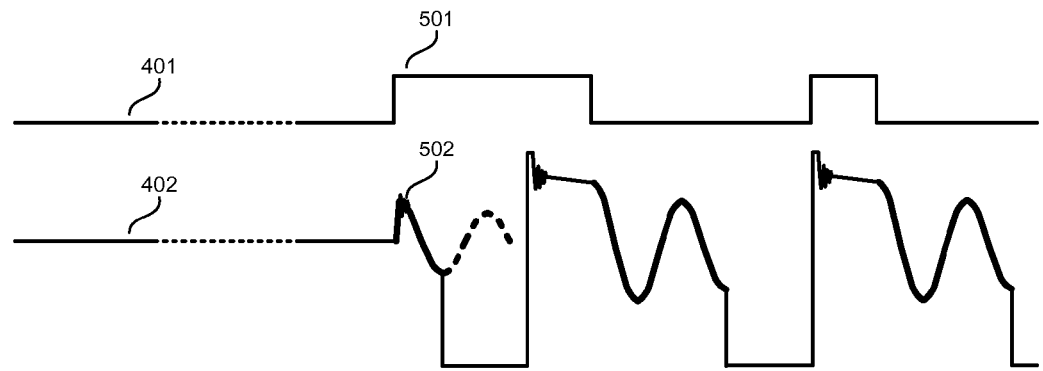
FIG. 10 is a waveform diagram showing operation of the communication apparatus according to the exemplary embodiment of FIG. 9.

FIG. 10 illustrates operation of the communication apparatus according to the exemplary embodiment of FIG. 9 in a startup mode, wherein a waveform 401 represents the drive signal 198, and a waveform 402 represents the voltage at the sense winding AUX of the magnetic element 102. The initial cycle 501 of the drive signal 198 facilitates a voltage transient 502. The receiver 109 detects the transient 502 and sends a command to the control circuit 110 to activate the controlled switch 103.

Figure 11:
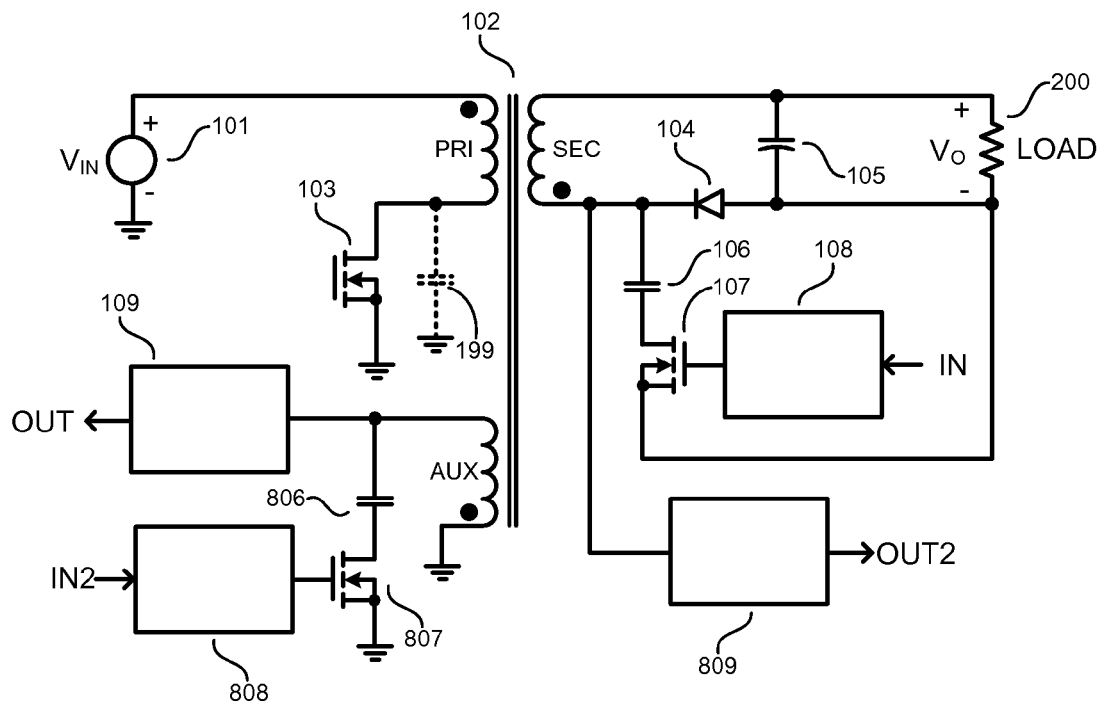
FIG. 11 is a circuit diagram of a communications apparatus according to yet another exemplary embodiment.

FIG. 11 depicts a communication apparatus according to another exemplary embodiment. The exemplary embodiment of FIG. 11 is similar to the exemplary embodiment of FIG. 1, but the present exemplary embodiment may also include a third controlled switch 807; a second transmitter 808; a second modulator capacitor 806; and a second receiver 809. The transmitter 808 activates the second controlled switch 807 in accordance with a second external input signal IN2. The third controlled switch 807 couples the second modulator capacitor 806 to the sense winding AUX of the magnetic element 102. The capacitor 806 contributes to the total parasitic capacitance 199 and alters the post-conduction oscillation frequency at the windings PRI, SEC, and AUX. The receiver 809 detects the change in the oscillation frequency at the winding SEC and generates an output signal OUT2 as a function of the second external input signal IN2. The second modulator capacitor 806 may alternatively be coupled to the primary winding PRI.

What is claimed is:

1. An apparatus comprising:
   a converter; and
   a communication apparatus;
   wherein the converter comprises a magnetic element having a primary winding and a secondary winding, a first switch, a control circuit configured to repeatedly activate the first switch to couple an input voltage source to the primary winding to store electrical energy in the magnetic element, and a diode coupled to the secondary winding, said diode configured to couple the secondary winding to a load to deliver the electrical energy stored in the magnetic element;
   wherein the converter comprises a capacitance at the primary winding and the secondary winding forming an LC circuit with the magnetic element; and
   wherein the communication apparatus comprises a second switch, a first modulator capacitor coupled to the secondary winding, a first transmitter configured to activate the second switch in accordance with a first input signal, and a first receiver configured to detect a change in an oscillation frequency of the LC circuit.

2. The apparatus of claim 1, wherein the capacitance is contributed by parasitic output capacitance of the first switch.

3. The apparatus of claim 1, wherein the first receiver is configured to detect a change in the oscillation frequency caused by coupling the first modulator capacitor to the secondary winding.

4. The apparatus of claim 1, wherein the first receiver is coupled to the primary winding to detect the oscillation frequency at the primary winding.

5. The apparatus of claim 1, wherein the first receiver generates an output signal based on the oscillation frequency detected by the first receiver.

6. The apparatus of claim 1, wherein the magnetic element further comprises an auxiliary winding, and
   wherein the first receiver is coupled to the auxiliary winding to detect the oscillation frequency of a voltage signal at the auxiliary winding.

7. The apparatus of claim 1, wherein the diode is replaced with an active synchronous rectifier switch.

8. The apparatus of claim 6, wherein the first receiver comprises:
   a sample-and-hold circuit that stores a voltage level of the auxiliary winding;
   a first divider circuit that generates a first reference voltage level based on a first divider ratio and the voltage level stored by the sample-and-hold circuit;
   a second divider circuit that generates a second reference voltage level based on a second divider ratio and the voltage level stored by the sample-and-hold circuit; and
   a window comparator that generates a pulse signal having a width corresponding to a period of time during which the voltage level of the auxiliary winding is between the first reference voltage level and the second reference voltage level.

9. The apparatus of claim 8, wherein the second reference voltage level is substantially zero.

10. The apparatus of claim 8, wherein the first receiver generates a first output signal based on the width of the pulse signal.

11. The apparatus of claim 5, wherein the first output signal generated by the first receiver is received as an input by the control circuit to control activation of the first switch.

12. The apparatus of claim 11, wherein the input signal received by the first transmitter is an output voltage at the load.

13. The apparatus of claim 6, further comprising:
   a third switch;
   a second transmitter configured to activate the third switch in accordance with a second input signal;
   a second modulator capacitor coupled to the second transmitter; and
   a second receiver configured to detect an oscillation frequency of a voltage signal at at least one of the primary, secondary and auxiliary windings.

14. The apparatus of claim 13, wherein the third switch is configured to couple the second modulator capacitor to the auxiliary winding.

15. The apparatus of claim 14, wherein the second receiver is configured to detect a change in the oscillation frequency caused by coupling the second modulator capacitor to the auxiliary winding.

16. The apparatus of claim 13, wherein the third switch is configured to couple the second modulator capacitor to the primary winding.

17. The apparatus of claim 13, wherein the second receiver is coupled to the secondary winding to detect the oscillation frequency of a voltage signal at the secondary winding.

18. The apparatus of claim 13, wherein the second receiver generates a second output signal based on the oscillation frequency detected by the second receiver.

19. A communication method comprising:
- generating post-conduction oscillation of a voltage signal at one or more windings of a magnetic element following substantial depletion of electrical energy stored in the magnetic element;
- activating a switch to couple a modulator capacitor to at least one of the windings of the magnetic element;
- detecting a change in a frequency of the post-conduction oscillation of the voltage signal at one or more windings of the magnetic element caused by coupling the modulator capacitor to the at least one of the windings of the magnetic element; and
- generating an output signal based on a result of detecting the change in the frequency of the post-conduction oscillation of the voltage signal at one or more windings of the magnetic element.

20. The communication method of claim 19, wherein the step of activating the switch to couple the modulator capacitor to at least one of the windings of the magnetic element comprises generating a driving signal to activate the switch.

21. The communication method of claim 20, wherein the driving signal corresponds to an output at a load coupled to a secondary winding of the magnetic element.

* * * * *